United States Patent

[11] 3,611,424

| [72] | Inventor | Milton Alden |
| | | Needham, Mass. |
| [21] | Appl. No. | 806,795 |
| [22] | Filed | Mar. 13, 1969 |
| [45] | Patented | Oct. 5, 1971 |
| [73] | Assignee | Alden Research Foundation |
| | | Brockton, Mass. |

[54] HELICAL ELECTRODE AND DRUM RECORDER
9 Claims, 6 Drawing Figs.

[52] U.S. Cl. .......................................... 346/101, 346/74 CH
[51] Int. Cl. .......................................... G01d 15/06
[50] Field of Search .......................................... 346/101, 139, 74 E, 74 CH, 74 S, 74 SB, 74 SC

[56] References Cited
UNITED STATES PATENTS

| 2,591,640 | 4/1952 | Tribble | 346/101 |
| 2,833,611 | 5/1958 | Alden | 346/101 |
| 3,417,405 | 12/1968 | Alden | 346/101 X |

*Primary Examiner*—Joseph W. Hartary
*Attorney*—Norman S. Blodgett

ABSTRACT: A recording capsule having a drum and helical electrode extending into a slot and having flexible shields on either side of the slot to define a narrow recording gap.

PATENTED OCT 5 1971
3,611,424
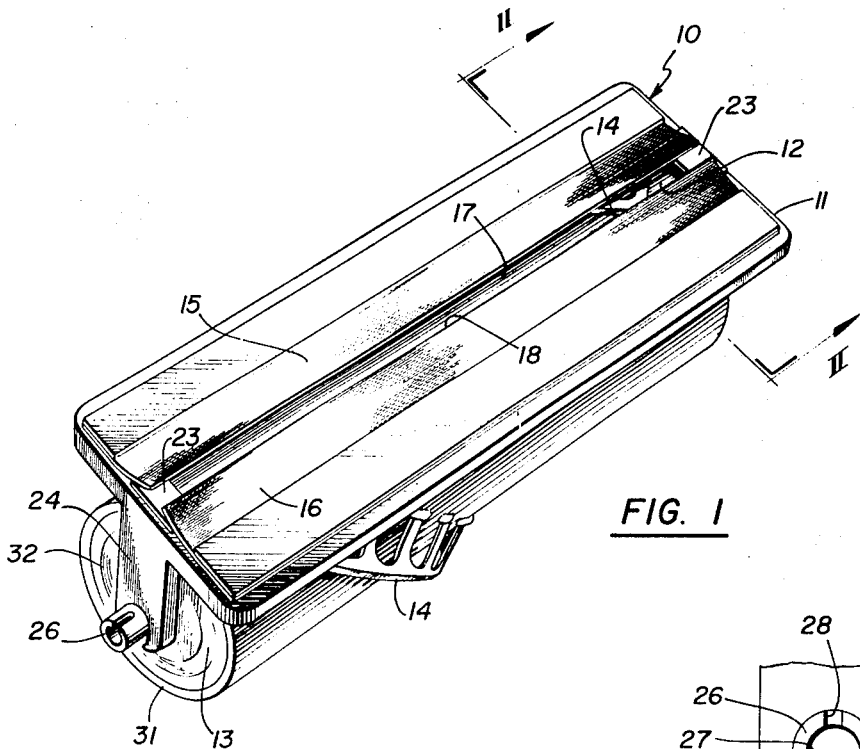
FIG. 1
FIG. 6
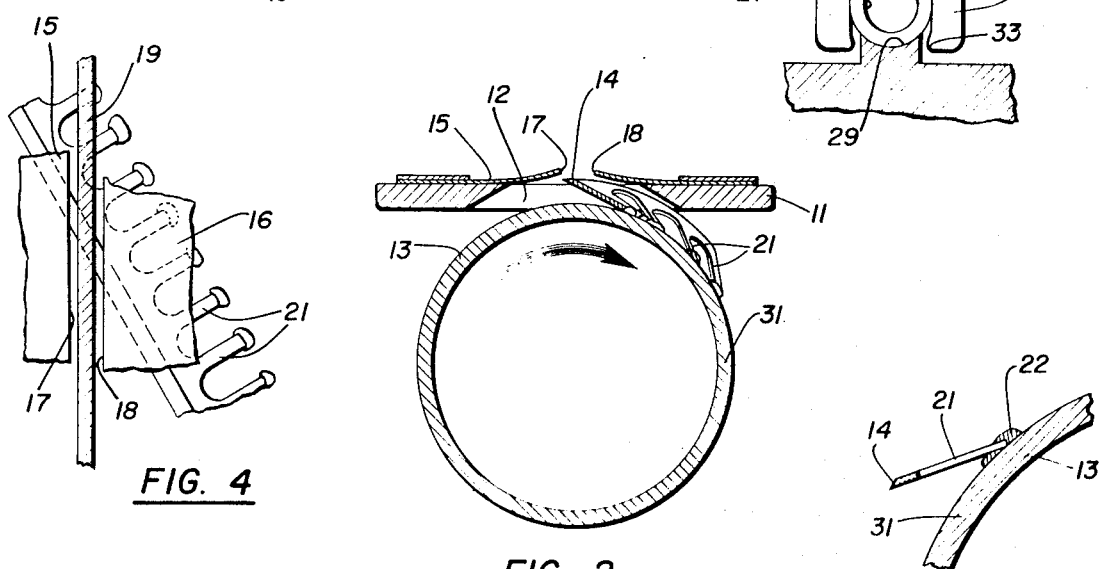
FIG. 4
FIG. 2
FIG. 5
MILTON ALDEN
INVENTOR.
BY
Norman S. Blodgett
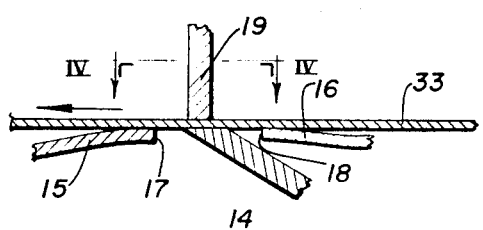
FIG. 3

3,611,424

HELICAL ELECTRODE AND DRUM RECORDER

BACKGROUND OF THE INVENTION

In the art of recording by the passage of an electrical signal through a chemically treated paper, it is well known to provide for horizontal sweeping or scanning by the use of a rotating helical electrode and a straight blade electrode. Attempts to develop an inexpensive recorder for use in such a graphic communications system have been frustrated by the fact that the operative elements must be very accurately located relative to one another. This have meant that the recorder housing had to be manufactured and adjusted by highly skilled personnel. Repair of the recorder because of accidental dislocation of the critical elements has often required that the recorder be returned to the factory. Furthermore, the definition of the recorded image has been less than of a desired quality because of a tendency of the electrical signal to pass in paths which are other than direct paths between the electrodes. These and other difficulties experienced with the prior art devices have been obviated in a novel manner by the present invention.

It is, therefore, an outstanding object of the invention to provide a recording capsule which incorporates all the important geometric relationships of a recorder.

Another object of this invention is the provision of a recording capsule which, when used in a recorder, allows the remainder of the recorder to be inexpensively manufactured by unskilled labor.

A further object of the present invention is the provision of a recording capsule which, when used in a recorder, permits the remainder of the recorder to be manufactured without adjustment.

It is another object of the instant invention to provide a recording capsule which can be assembled in a recorder without adjustment after assembly.

A still further object of the invention is the provision of a recording capsule which can be quickly and easily replaced in a recorder, thus avoiding repair and adjustment by skilled personnel.

It is a further object of the invention to provide a recording capsule which has means for shielding the gap between electrodes to produce improved definition at low cost.

It is a still further object of the present invention to provide a recording capsule incorporating in a single replaceable element locating surfaces for a blade electrode of a recorder and a locating means for the axis of a helical drum electrode.

SUMMARY OF THE INVENTION

In general, the invention has to do with a recording capsule for use in a recorder. It includes a main plate having an elongated slot and a drum rotatably mounted at one side of the plate with a helical electrode extending into the slot. Flexible Teflon shields are mounted on the other side of the plate and extend from opposite sides of the slot. These shields have spaced, parallel edges lying adjacent the centerline of the slot to define a narrow recording gap.

The plate has an abutment with a locating surface extending from the other side at each end of the slot to locate the edge of a blade-type electrode when the capsule is incorporated in a recorder. The plate is also provided with bearing surfaces accurately spaced relative to the locating surfaces; these bearing surfaces receive shafts extending from the drum.

BRIEF DESCRIPTION OF THE DRAWINGS

The character of the invention, however, may be best understood by reference to one of its structural forms, as illustrated by the accompanying drawing, in which:

FIG. 1 is a perspective view of a recording capsule embodying the principles of the present invention, FIG. 2 is a sectional view of the capsule taken on the line II—II of FIG. 1, FIG. 3 is an enlarged view of the operative portions of the capsule, FIG. 4 is a view taken on the line IV—IV of FIG. 3, FIG. 5 is a sectional view of a portion of the apparatus, and FIG. 6 is an end view of the apparatus.

DESCRIPTION OF THE PREFERRED EMBODIMENT

Referring first to FIG. 1, which best shows the general features of the invention, the recording capsule, indicated generally by the reference numeral 10, is shown ready for incorporation into a graphic communications recorder of the type shown and described in the patent of Alden U.S. Pat. No. 3,417,405. The capsule consists of a main plate 11 of generally elongated rectangular shape having a central rectangular aperture or slot 12. A drum 13 is rotatably mounted at one side of the plate and is provided with a helical electrode 14 which extends into the slot; the drum is of the type shown and described in the patent application of Alden, Ser. No. 793,132, filed Jan. 22, 1969.

Flexible shields 15 and 16 are mounted on the other side of the slot. The shields 15 and 16 are provided with straight-spaced parallel edges 17 and 18, respectively, which lie adjacent the centerline of the slot to define a narrow recording gap. The shields 15 and 16 are formed of Teflon sheet, so that they present little friction to the helical electrode 14 and a straight blade electrode 19 (see FIG. 3) of the recorder. Further, the nature of such elastomeric plastics is that they will not injure the tender surface of the moist, chemically treated paper. At the same time, the material wears very little.

As is best evident in FIG. 5, the helical electrode 14 consists of a sheet metal strip which has laterally extending tabs 21 whose ends are embedded in mounds 22 of elastomer cement (such as a silicone plastic) on the surface of the drum.

The plate is provided at each end of the slot 12 with an integral abutment with a locating surface 23 which serves as a stop for the edge of the blade electrode 19, which it will be understood is resiliently biased toward engagement with the helical electrode.

A leg 24 extends from the underside of the plate at each end of the slot, so that one leg is provided under and corresponding to each of the locating surfaces 23. Each leg has a cylindrical bearing surface 25 (see FIG. 6) accurately located a predetermined distance from its corresponding locating surface. The drum 13 has a shaft 26 which is accurately located coaxially of the operative edge of the helical electrode. The shaft is adapted to nest tightly against the bearing surface 25 and the shaft shown in FIGS. 1 and 6 is formed with a bore 27 and a keyway 28 for connection to a motor drive forming part of the recorder proper. The recess in the recorder housing in which the drum resides is provided with cylindrical concave seats 29 to receive the surface of the shaft opposite that engaged by the bearing surface 25.

The drum 13 consists in the preferred embodiment of a cardboard tube 31 in each end of which is inserted a plastic plug 32 in which the shaft 26 is fixed.

In operation, the rotation of the drum 13 causes successive portions of the helical electrode to appear in the gap between the edges 17 and 18 of the shields 15 and 16. The blade electrode 19 of the recorder proper rests against the locating surfaces 23 at the ends of the gap. During the sweeping or scanning action of the helical electrode along the blade electrode, the electrical signal passes from one to the other through the chemically treated paper 33. Although the theoretical projection of the operative edge of the blade electrode on the operative edge of the helical electrode is a diamond-shaped figure (see FIG. 4), the passage of current between the two is by ion migration from one to the other. The paper is in a highly moist condition and the moisture is an electrolyte; this means that the path of ion flow deviates in practice from a straight line. This results in a visual image whose definition can be less than perfect because of this "stray" migration. In the present device, however, the shields 15 and 16 act as insulating members that tend to inhibit the sideways flow of current. The gap between the edges 17 and 18 is only slightly larger than the width of the blade electrode 19, as is best evident in FIG. 4, and this has a tendency to restrict the width of the recording path and to improve the definition. Similarly, if one wishes to increase the thickness of the two electrodes to increase their durability, this can be done without sacrificing the definition of the recorded image.

The fact that the important geometric relationship between the two electrodes is determined by surfaces entirely within the capsule means that the remainder of the recorder can be constructed without particular attention to accuracy and ability to adjust. The locating surfaces 23 and the bearing surfaces 25 can be accurately related, for instance, by molding the plate and legs as a one-piece precision plastic injection molding. If, during the operation of the recorder, the quality of the image seems to be deteriorating, it is only necessary to remove the capsule and replace it with a new one. There is no need to ship the entire recorder back to the factory for repair or adjustment. During manufacture there is not need for final adjustments by skilled personnel; the recorder is assembled by joining the capsule to the recorder proper.

With these and other objects in view, as will be apparent to those skilled in the art, the invention resides in the combination of parts set forth in the specification and covered by the claims appended hereto.

I claim:

1. A recording capsule, comprising
   a. a main plate having elongated slot,
   b. a drum rotatably mounted at one side of the plate and having a helical electrode extending into the slot,
   c. flexible shields mounted on the other side of the plate and extending from opposite sides of the slot, the shields having spaced, parallel edges lying adjacent the centerline of the slot to define a narrow recording gap.

2. A recording capsule as recited in claim 1, wherein the shields are thin sheets of Teflon.

3. A recording capsule as recited in claim 1, wherein the helical electrode consists of a sheet metal strip having laterally extending tabs whose ends are mounted in mounds of elastomer cement on the surface of the drum.

4. A recording capsule as recited in claim 1, wherein an abutment has a locating surface extending from the said other side of the plate at each end of the slot.

5. A recording capsule as recited in claim 4, wherein a leg extends from the said one side of the plate at each end of the slot, each leg having a bearing surface accurately located a predetermined distance from the corresponding locating surface, the drum having a shaft extending from each end which is accurately located coaxially of the edge of the helical electrode and adapted to be held in engagement with the corresponding bearing surface.

6. A recording capsule as recited in claim 5, wherein the bearing surface is part of a slot formed in the free end of the leg and having an opening directed away from the plate, the edges of the slot having inwardly directed nibs which lock the shaft of the drum against the bearing surface.

7. A recorder comprising
   a. a main plate having an elongated slot,
   b. a helical electrode mounted at one side of the plate extending into the slot, and
   c. flexible shields mounted on the plate extending from opposite sides of the slot, the shields having spaced parallel edges lying within the slot to define a narrow recording gap.

8. A recorder as recited in claim 7, wherein the helical electrode is mounted for rotation on an axial shaft and wherein a drive means is associated with the shaft which is capable of effective operation despite a certain degree of misalignment.

9. A recording capsule, comprising
   a. a main plate having an elongated slot,
   b. a drum rotatably mounted at one side of the plate and having a helical electrode extending into the slot,
   c. an abutment having a locating surface extending from the other side of the plate at each end of the slot,
   d. a leg extending from the said one side of the plate at each end of the slot, each leg having a bearing surface accurately located a predetermined distance from the corresponding locating surface, the drum having a shaft extending from each end which is accurately located coaxially of the edge of the helical electrode and adapted to be held in engagement with the corresponding bearing surface, the bearing surface being part of a slot formed in the free end of the leg and having an opening directed away from the plate, the edges of the slot having inwardly directed nibs which lock the shaft of the drum against the bearing surface.